United States Patent
Eul et al.

(10) Patent No.: US 8,890,046 B2
(45) Date of Patent: Nov. 18, 2014

(54) LIGHTING DEVICE ON AN EXTERNAL CONTROL STAND OF A CONSTRUCTION MACHINE

(71) Applicant: Joseph Vogele AG, Ludwigshafen/Rhein (DE)

(72) Inventors: Achim Eul, Mannheim (DE); Horst Ramb, Worms (DE)

(73) Assignee: Joseph Vogele AG, Ludwigshafen/Rhein (DE)

( * ) Notice: Subject to any disclaimer, the term of this patent is extended or adjusted under 35 U.S.C. 154(b) by 192 days.

(21) Appl. No.: 13/633,300

(22) Filed: Oct. 2, 2012

(65) Prior Publication Data

US 2013/0082161 A1    Apr. 4, 2013

(30) Foreign Application Priority Data

Oct. 4, 2011   (EP) ..................... 11008029

(51) Int. Cl.
  *G01J 1/32*   (2006.01)
  *B60Q 1/24*   (2006.01)
  *E01C 19/48*  (2006.01)
(52) U.S. Cl.
  CPC .. *B60Q 1/24* (2013.01); *E01C 19/48* (2013.01)
  USPC ....................................... 250/205
(58) Field of Classification Search
  USPC ......... 250/205, 214 R, 239, 227.22; 362/374, 362/375, 505, 506; 200/314; 701/36, 45, 701/50, 70
  See application file for complete search history.

(56) References Cited

U.S. PATENT DOCUMENTS

| | | | | |
|---|---|---|---|---|
| 4,234,908 A | * | 11/1980 | McGee | ............. 362/506 |
| 6,802,631 B1 | | 10/2004 | Dakshina-Murthy et al. | |
| 2011/0236131 A1 | | 9/2011 | Heindtel | |

FOREIGN PATENT DOCUMENTS

| | | |
|---|---|---|
| CN | 1361732 A | 7/2002 |
| CN | 102199910 A | 9/2011 |
| DE | 202009018279 U1 | 10/2011 |
| JP | S43 017618 Y | 7/1968 |
| JP | S54 28354 Y2 | 9/1979 |
| JP | S64 40744 U | 3/1989 |

OTHER PUBLICATIONS

European Search Report mailed Mar. 8, 2012, which issued in corresponding EP Application No. EP11008029.
Office action which issued on Jun. 17, 2014 in corresponding Japanese Application No. 2012-219528, with English translation thereof.
Office action which issued on Jul. 10, 2014 in corresponding Chinese Application No. 2012-10378132.9, with English translation thereof.

* cited by examiner

*Primary Examiner* — Que T Le
(74) *Attorney, Agent, or Firm* — Fish & Richardson P.C.

(57) ABSTRACT

An external control stand for a self-propelled construction machine. The construction machine has a working component that can be operated from the external control stand. The invention includes a lighting device for illuminating a ground section on the external control stand, as seen in the direction of travel, in front of, behind and/or below the external control stand.

14 Claims, 2 Drawing Sheets

LIGHTING DEVICE ON AN EXTERNAL CONTROL STAND OF A CONSTRUCTION MACHINE

BACKGROUND OF THE INVENTION

The invention relates to an external control stand for a construction machine configured for controlling at least one working component of the construction machine.

FIELD OF THE INVENTION

Such external control units ("external control unit" and "external control stand" will be used interchangeably in the following) for self-propelled construction machines are known in practice. For example, they are used in road pavers in order to carry out adjustments to a working component of the road paver primarily while driving. For example, during the paving process, it can be necessary to adjust the screed, particularly an extending screed with variable width that is mounted to the road paver in order to adapt its position to the course of the road or to avoid obstacles.

It is further known that road pavers are often used for road construction in the dark or in road tunnels. In order to guarantee that the operating personnel have sufficient lighting of the paving path, auxiliary lights are used. In the case of conventional road pavers, these auxiliary lights are put to use with external power outlets. Detrimental in this is that it is necessary to provide external power outlets and that these can become dirty. These separate auxiliary lights must furthermore be supported or held in a suitable manner.

The object of the present invention is to provide an external control unit for a construction machine whereby this external control stand allows improved operation of the construction machine while using the simplest possible design measures.

SUMMARY OF THE INVENTION

This object is solved by an external control stand for a construction machine with the features of the present invention.

According to the invention, a lighting device is provided on the external control stand of a self-propelled construction machine. The lighting device is used to illuminate a ground section that is located, seen in the direction of travel, in front of, behind and/or below the external control stand. This lighting device offers the advantage that there is no need for auxiliary light that is supplied by means of an external power outlet. Consequently, it is not necessary to provide a power socket, nor is it necessary for operating personnel to hold or clamp on an additional light. There is consequently no impairment in the handling of the road paver in the dark. Suitable as illuminants for the lighting device are, for example, a single LED or an array of LEDs.

The lighting device is preferably integrated into the external stand. For this purpose, the housing of the external control unit has, e.g., a corresponding recess on the surface that is facing towards the road surface. Advantageous in this is that the lighting device is protected against mechanical impairments. Additional built-on parts are furthermore avoided.

It is expedient if a transparent and/or translucent cover is provided for the lighting device. Such a covering protects the lighting device effectively against dust, splash water and other environmental influences. The covering is nevertheless light-permeable, so that the effect of the lighting device is ensured. The covering is preferably manufactured from a suitable plastic. An optional seal on the covering additionally prevents dust or humidity from penetrating into the lighting device.

It is particularly advantageous if the covering of the lighting device is attached to the external control unit with a detachable connection. This makes it possible to carry out maintenance work on the lighting device without dismantling larger parts of the external control unit. This enables easier maintenance of the lighting device.

In an advantageous variant of the invention, the external control stand has a diffuser lens for the lighting device. A desired diffusion or attenuation of the light beam can be adjusted by means of an appropriate pattern in the diffuser lens.

It is particularly advantageous if the lighting device is fixed with regard to its orientation relative to the external control stand. This allows for a defined, stable and vibration-resistant illumination of the ground section.

It can, however, also be advantageous if the lighting device is variably adjustable with respect to its orientation relative to the external control stand. As a result, the light beam can be directed in particular directions in order to have an active influence on the illuminated ground section. By means of suitable attenuation devices, it is possible to avoid disadvantages if vibrations arise.

It is particularly advantageous if the lighting device can be activated and/or deactivated from the external control unit. In this way, the operating personnel at the external control stand can themselves control when the lighting device is activated or deactivated.

It is expedient if the brightness of the lighting device is variable. In this way, the illumination of the ground section can additionally be influenced and adapted to the external conditions.

In a particularly advantageous variant of the invention the lighting device is configured for automatic activation and/or deactivation by means of a light-sensitive sensor. The lighting device can consequently, e.g., when driving into a road tunnel, be activated without the assistance of the operating personnel, so that the operating personnel are not distracted while operating the construction machine.

In order to avoid loose cable connections, a device for the power supply can be provided that is shared by the external control stand and the lighting device.

It is particularly advantageous if the external control stand is disposed on a working component that can be moved and/or pivoted relative to a supporting frame of the construction machine, for example, on a screed or an extendable screed. In this way, when the working component is pivoted or moved, the lighting device moves along with it, so that optimal illumination of the changed ground section is guaranteed.

The invention also relates to a construction machine, for example, a road paver or a feeder, with an external control unit of the type described above.

BRIEF DESCRIPTION OF THE DRAWINGS

In the following, an advantageous embodiment of the invention is described in more detail using the accompanying drawings. In detail, shown are.

DETAILED DESCRIPTION OF THE INVENTION

Figure 1:
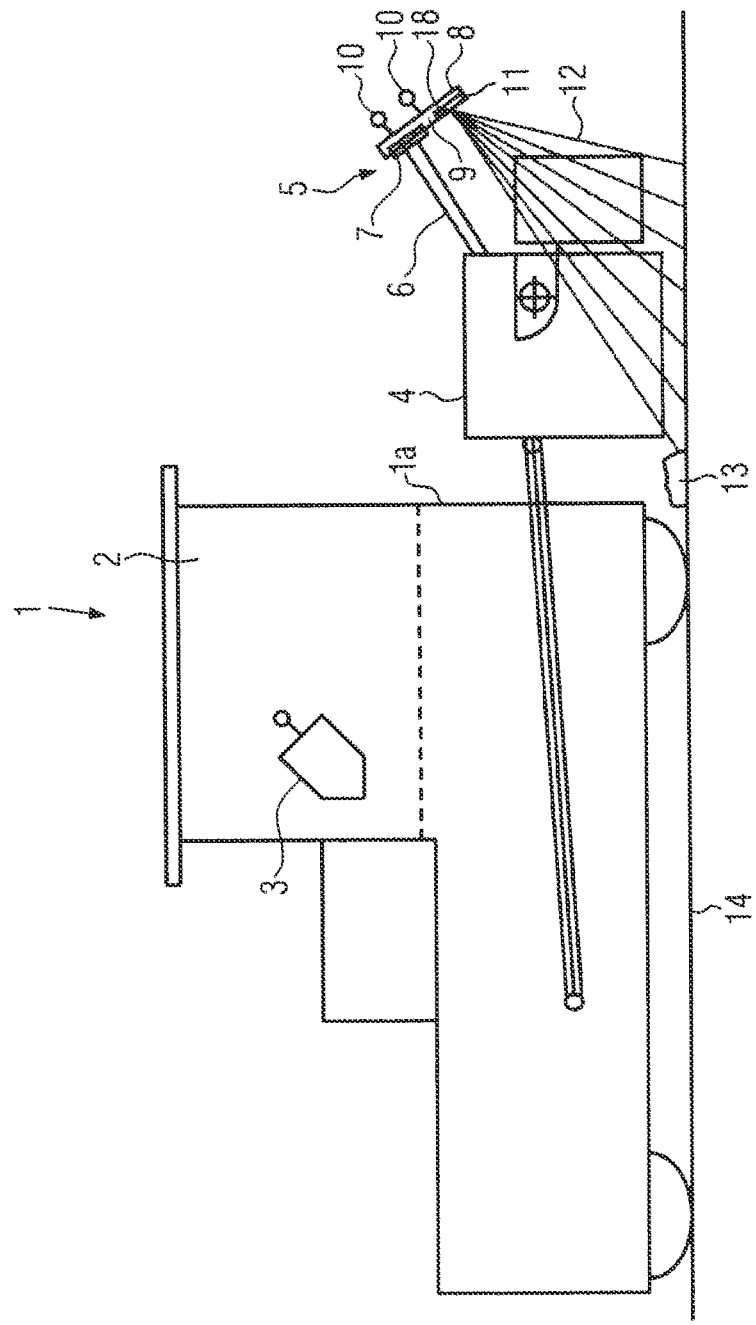
FIG. 1 a side view of an external control stand according to the invention on a road paver given as an example of a self-propelled construction machine and FIG. 2 a schematic bottom view of an external control unit according to the invention with a lighting device according to the invention.

FIG. 1 shows a schematically depicted construction machine 1, which, in this embodiment, is a road paver. The construction machine 1 has a supporting frame 1a. To control the main functions, such as, for example, the driving and steering of the construction machine 1, the construction machine 1 has a driver's cabin 2 that holds a control console 3. On its rear end as seen in the direction of travel, the construction machine 1 has a working component 4 in the form of a screed. The working component 4 is attached to the construction machine 1 in such a manner that it can be shifted, pulled out or extended, and pivoted.

For controlling the working component 4, the construction machine 1 has an external control stand 5 that is arranged, when seen in the direction of travel, behind the working component 4. The external control stand 5 is primarily provided to align the working component 4 according to the course of the road or obstacles during a paving procedure. The external control stand 5 is normally operated by one person, who moves on foot along with the construction machine 1. The working component 4 can be operated electro-hydraulically.

The external control stand 5 comprises a holding device 6 for mounting of the external control stand 5 to the working component 4. The external control stand 5 is thereby mounted to the working component 4 in such a manner that it always moves along with the working component 4 when it is pivoted and extended laterally. An operating panel 8 is attached to the holding device 6 by means of a holding receptacle 7. The operating panel 8 has a housing 9 that is made of plastic and that has on its upper side operating elements 10 for controlling the working component 4. On the bottom side of the housing, the holding receptacle 7 is integrated into the housing.

According to the invention, the housing 9 of the operating panel 8 additionally has a lighting device 11 that is integrated into the housing 9. The lighting device 11 is provided for the purpose of emitting visible light 12 from the external control unit 5. In this way, the generated light 12 makes it possible, for example, to detect an obstacle 13 on the driving route 14 and to steer the working component 4 around the obstacle correspondingly.

Figure 2:
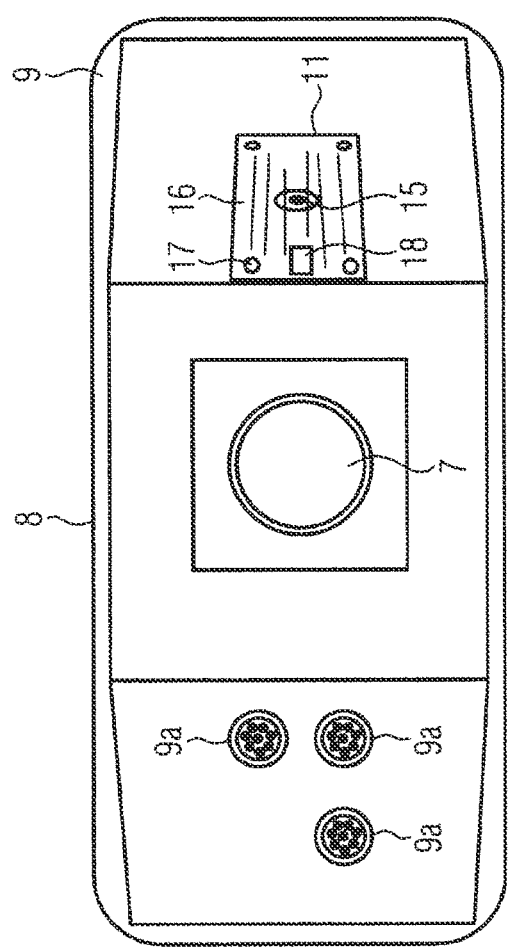

The arrangement of the lighting device 11 on the external control unit 5 according to the invention is explained in more detail on the basis of FIG. 2, which depicts the bottom side of the operating panel 8 schematically. The housing 9 has a plurality of electrical connections 9a that are used as an interface between the operating panel 8 and the working component 4 or the construction machine 1 respectively. As described above, the lighting device 11 is integrated into the housing 9 of the operating panel 8. For this purpose, the housing 9 has a recess that has approximately the size of the lighting device 11 and that accommodates the lighting device 11. The housing 9 has an electrical connection that is provided therein and that is used for an illuminant 15 of the lighting device 11. The illuminant 15 is covered, and consequently protected from dust, splash water or other environmental influences, by a cover 16. The cover 16 is executed in a light-permeable (translucent) manner and can additionally configured to be is transparent. The cover 16 can be used as a diffuser lens in order to achieve the optimal illumination of the driving route 14.

The cover 16 is attached to the housing 9 of the operating panel 8 by means of a screw threaded connection 17. The orientation of the lighting device 11 on the external control unit 5 is preferably configured in such a manner that the visible light 12 is not obstructed by the working component 4.

During the operation of the construction machine 1, the lighting device 11 can be activated and deactivated by means of the operating panel 8. In the switched-on state, the illuminance of the lighting device 11 amounts to at least 15 lx, whereby the object distance (i.e., the distance from the driving route 14) amounts to approximately 1.4 meters. The area illuminated in this way is approximately one square meter. This corresponds to a radiation angle of the illuminant 15 (i.e., the aperture angle of the light cone emitted by the lighting device 11) of roughly 65° to 70°. The mean angle between the lighting device 11 that is integrated into the housing 9 and the driving route 14 amounts to between 30° and 80°, preferably however at least 45°, with respect to the vertical.

Based on the depicted embodiment, the external control stand 5 according to the invention can be modified in various ways. For example, it would be possible to provide a light-sensitive sensor 18 for the lighting device 11, whereby this light-sensitive sensor 18 automatically activates the lighting device 11 at twilight or in the dark, for example, when driving into a road tunnel. The sensor 18 could, e.g., also be arranged in front of the working component 4 when seen in the direction of travel of the construction machine 1. The brightness of the lighting device 11 could furthermore be variably adjustable. It could furthermore be provided that the lighting device 11 is variably adjustable with regard to its orientation relative to the external control stand 5. In a further variant of the invention, the radiation angle of the lighting device 11 could be variably adjustable. For example, this could be realized by means of a variable lens or an adjustable reflector.

The invention claimed is:

1. External control stand for a self-propelled construction machine configured for controlling at least one working component of the construction machine, comprising a lighting device on the external control stand for illuminating a ground section, in front of, behind and/or below the external control stand-as seen in the direction of travel of the construction machine.

2. External control stand according to claim 1 wherein the lighting device is integrated into the external control stand.

3. External control stand according to claim 2 wherein the lighting device includes a transparent and/or translucent cover.

4. External control stand according to claim 3 wherein the cover is mounted to the external control stand with a detachable connection.

5. External control stand according to one claim 1 wherein the lighting device includes a diffuser lens.

6. External control stand according to claim 1 wherein the lighting device is fixed with regard to its orientation relative to the external control stand.

7. External control stand according to claim 1 wherein the lighting device is variably adjustable with regard to its orientation relative to the external control stand.

8. External control stand according to claim 2 wherein an adjustment of the external control stand adjusts the ground section that is illuminated by the lighting device.

9. External control stand according to claim 1 wherein the lighting device can be activated and/or deactivated from the external control stand.

10. External control stand according to claim 1 wherein the brightness of the lighting device is variable.

11. External control stand according to claim 1 wherein the lighting device includes apparatus for automatic activation and/or deactivation by means of a light-sensitive sensor.

12. External control stand according to claim 1 wherein the external control stand and the lighting device share a device that supplies power to the external control stand and the lighting device.

13. External control stand according to claim 1 wherein the external control stand is attached to a working component that is movable and/or pivotable relative to a supporting frame of the construction machine.

14. Construction machine according to claim 1 comprising a road paver or feeder.

* * * * *